United States Patent [19]

Charpie

[11] Patent Number: 5,937,736
[45] Date of Patent: Aug. 17, 1999

[54] WOBBLE PISTON WITH COOLING FINS EXTENDING THROUGH SLOTS FORMED IN THE PISTON HEAD

[76] Inventor: Mark E. Charpie, 3933 Meadowview St., Lambertville, Mich. 48144

[21] Appl. No.: 08/924,676

[22] Filed: Sep. 5, 1997

[51] Int. Cl.⁶ .......................................................... F16J 9/00
[52] U.S. Cl. .............................................. 92/240; 92/255
[58] Field of Search ............................. 92/172, 240, 255, 92/179

[56] References Cited

U.S. PATENT DOCUMENTS

| | | | |
|---|---|---|---|
| 3,695,150 | 10/1972 | Salzmann | 92/172 |
| 4,078,529 | 3/1978 | Warwick | 418/94 |
| 5,231,917 | 8/1993 | Wood | 92/140 |
| 5,644,969 | 7/1997 | Lew et al. | 92/172 |

*Primary Examiner*—Thomas E. Denion
*Attorney, Agent, or Firm*—Marshall & Melhorn

[57] ABSTRACT

An improved wobble piston for an air compressor. The piston has a head integrally connected to a connecting rod. The connecting rod has a free end for connection to a rotating eccentric. The piston has cooling fins to provide cooling as the piston is reciprocated in a cylinder. The cooling fins extend from a piston cap secured to the piston head. The fins extend through cooperating slots formed in piston head.

6 Claims, 2 Drawing Sheets

WOBBLE PISTON WITH COOLING FINS EXTENDING THROUGH SLOTS FORMED IN THE PISTON HEAD

BACKGROUND OF THE INVENTION

1. Field of the Invention

The invention relates to pistons for reciprocating piston air compressors and, more particularly, to an improved air cooled wobble piston for an air compressor.

2. Summary of Related Art

Two types of pistons are used in reciprocating piston air compressors. In a first piston design, the piston has a cylindrical shape and is confined to slide in a cylinder without rotating relative to the cylinder. A connecting rod has an end connected to the piston and has a free end connected to a rotating eccentric. Since the piston cannot rotate with the connecting rod, it is necessary to provide a hinge connection between the connecting rod and the piston through the use of a wrist pin. In order for the compressor to operate, oil lubrication must be provided for the reciprocating piston. The oil may be sprayed at the bottom of the piston for cooling. In this type of piston, there is essentially no induced air flow over the bottom of the piston because the linear reciprocation of the piston establishes a uniform air pressure thereacross.

A second common piston design, generally referred to as a wobble piston, does not require oil lubrication. The piston is rigidly secured to the connecting rod. The piston is provided with a sufficiently thin profile to allow the piston to wobble or rock in the cylinder with the connecting rod as the piston is reciprocated. A resilient seal is provided around the periphery of the piston to allow the piston to tilt in the cylinder without loss of a gas tight seal between the piston and the cylinder. The sliding seal and a smooth coating on the cylinder reduce friction so that oil lubrication is not required.

The service life of a wobble piston compressor is often limited by the life of the piston seal. Many factors have been found to affect the seal life. In general, seal life is improved both by reducing friction between the seal and the cylinder and by reducing the temperature of the seal. Since heat is released when air is compressed, it has been found important to cool the cylinder and the piston as much as possible to enhance seal life.

The operating efficiency of a compressor also can be degraded by heat. For strength while minimizing weight, prior art pistons typically have been formed as a relatively thick aluminum casting. Heat absorbed by the piston during the compression stroke is transferred from the piston top to air drawn into the cylinder during the subsequent intake stroke. This causes the air to expand and consequently reduces the volumetric efficiency of the compressor.

One attempt to provide improved cooling in a wobble type piston is illustrated in U.S. Pat. No. 5,231,917. In the wobble piston disclosed therein, the piston head is provided with an internal chamber. Openings are formed through the piston head into the chamber on opposite sides of the connecting rod in a plane perpendicular to the eccentric axis. The location of the chamber openings establishes a flow of cooling air through the chamber as the piston is reciprocated in a cylinder.

SUMMARY OF THE INVENTION

This invention relates to a wobble piston having improved cooling. The top of the piston is formed with cooling fins on the bottom side of the piston cap. The piston cap cooling fins extend downward where they are exposed to cooler ambient air. As the wobble piston moves, a pressure differential between the two sides of the piston is created which in turn establishes an air flow across the piston cap fins to cool the piston and particularly to cool the piston cap. The cooling air flow both reduces the piston seal temperature and increases the volumetric efficiency of the compressor.

Accordingly, it is an object of the invention to provide an improved wobble piston or a reciprocating piston air compressor.

Other objects and advantages of the invention will become apparent from the following detailed description of the invention and the accompanying drawings.

DETAILED DESCRIPTION OF A PREFERRED EMBODIMENT

For purposes of description herein, the terms "upper," "upward," "lower," "downward," "below," "right," "left," "rear," "front," "vertical," "horizontal," and derivatives thereof shall relate to the invention oriented in FIGS. 3 and 4. However, it is to be understood that the invention may assume various alternative orientations, except where expressly specified to the contrary. It is also to be understood that the specific devices illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
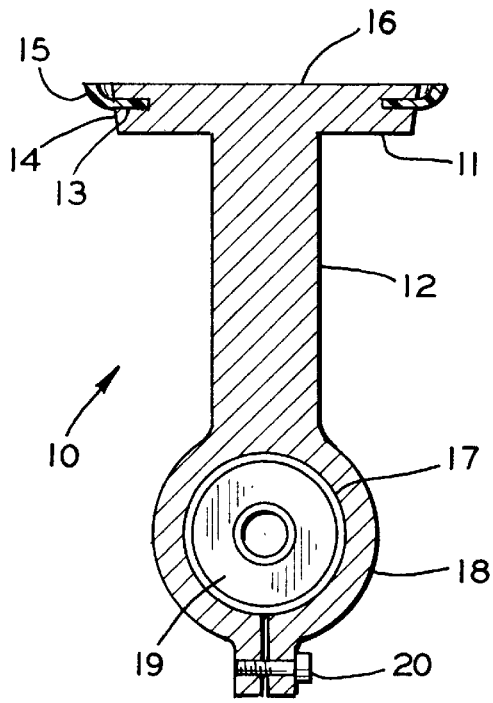
FIG. 1 is a cross sectional view through a typical prior art wobble piston for an air compressor.

Referring to FIG. 1 of the drawings, an exemplary prior art wobble piston 10 is illustrated in section. The piston 10 includes a head 11 and an integral connecting rod 12. The head 11 and connecting rod 12 are typically cast from a strong light weight material such as an aluminum alloy. The head 11 has a generally flat circular configuration with a groove 13 formed in its periphery 14 for receiving a cup shaped ring or seal 15. The head 11 must have sufficient thickness to withstand the pressures exerted by compressed air on the head 11. The needed thickness of the head 11 presents a relatively high thermal resistance which transfers an unnecessarily high amount of heat to the seal 15 and to intake air contacting a top surface 16 of the piston head 11. The piston head 11 is flat with no fins for cooling. The periphery 14 may be slightly conical to provide clearance when the piston head 11 tilts in a cylinder (not shown). A circular opening 17 is formed in a free end 18 of the connecting rod 12. An eccentric bearing 19 is clamped in the opening 17 by a screw 20.

Figure 2:
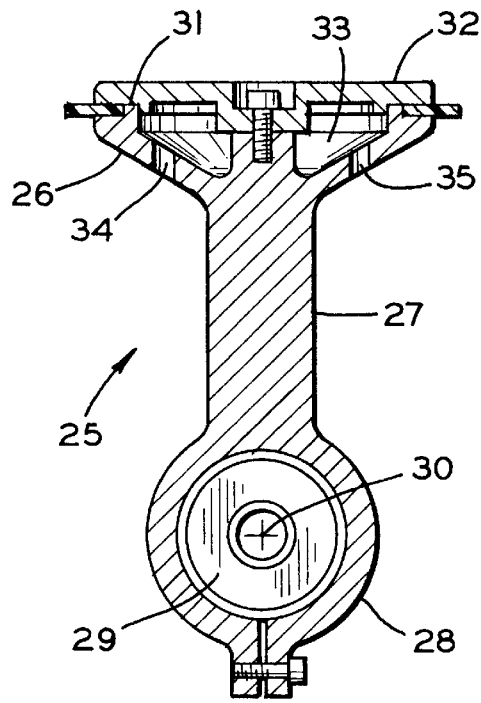
FIG. 2 is a cross sectional view through another prior art wobble piston for an air compressor.

A further prior art wobble piston is shown in FIG. 2. The prior art wobble piston 25 has a head 26 formed integrally with a connecting rod 27. The connecting rod 27 has a lower or free end 28 which mounts a bearing 29 in a conventional manner. The piston head 26 is generally conical or cup shaped and has an upwardly opening top edge 31. A cap 32 is positioned on the top edge 31 to define an enclosed chamber 33 in the piston head 26. Two openings 34 and 35 extend through the head 26 into the chamber 33. The openings 34 and 35 are located on opposite sides of the connecting rod 27 in a plane perpendicular to the axis 30. The location of the openings 34 and 35 cause air to flow through the chamber 33 as the piston 25 is reciprocated. The bottom of the piston cap 32 is smooth with no fins for cooling.

Figure 3:
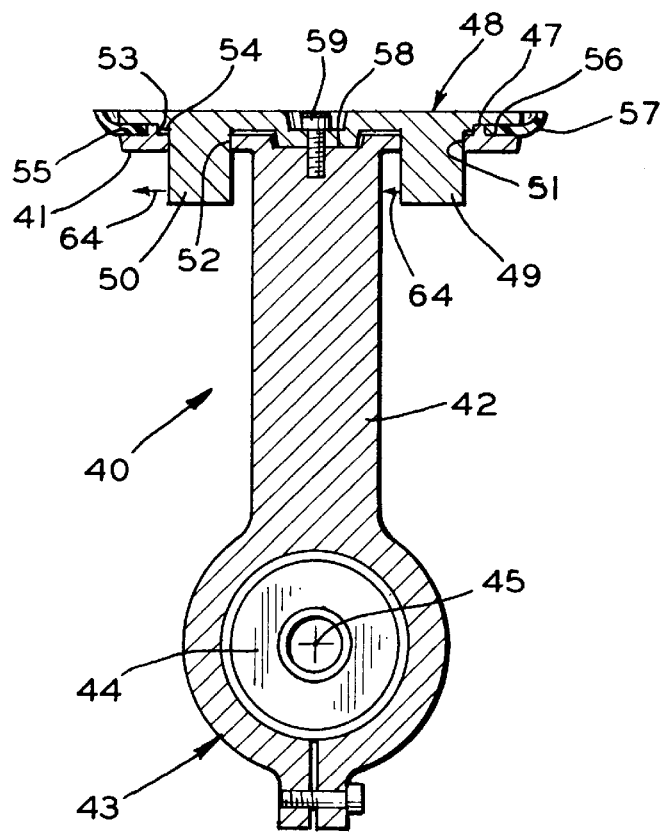
FIG. 3 is a cross sectional view through an improved air cooled wobble piston for an air compressor in accordance with the invention.
Figure 4:
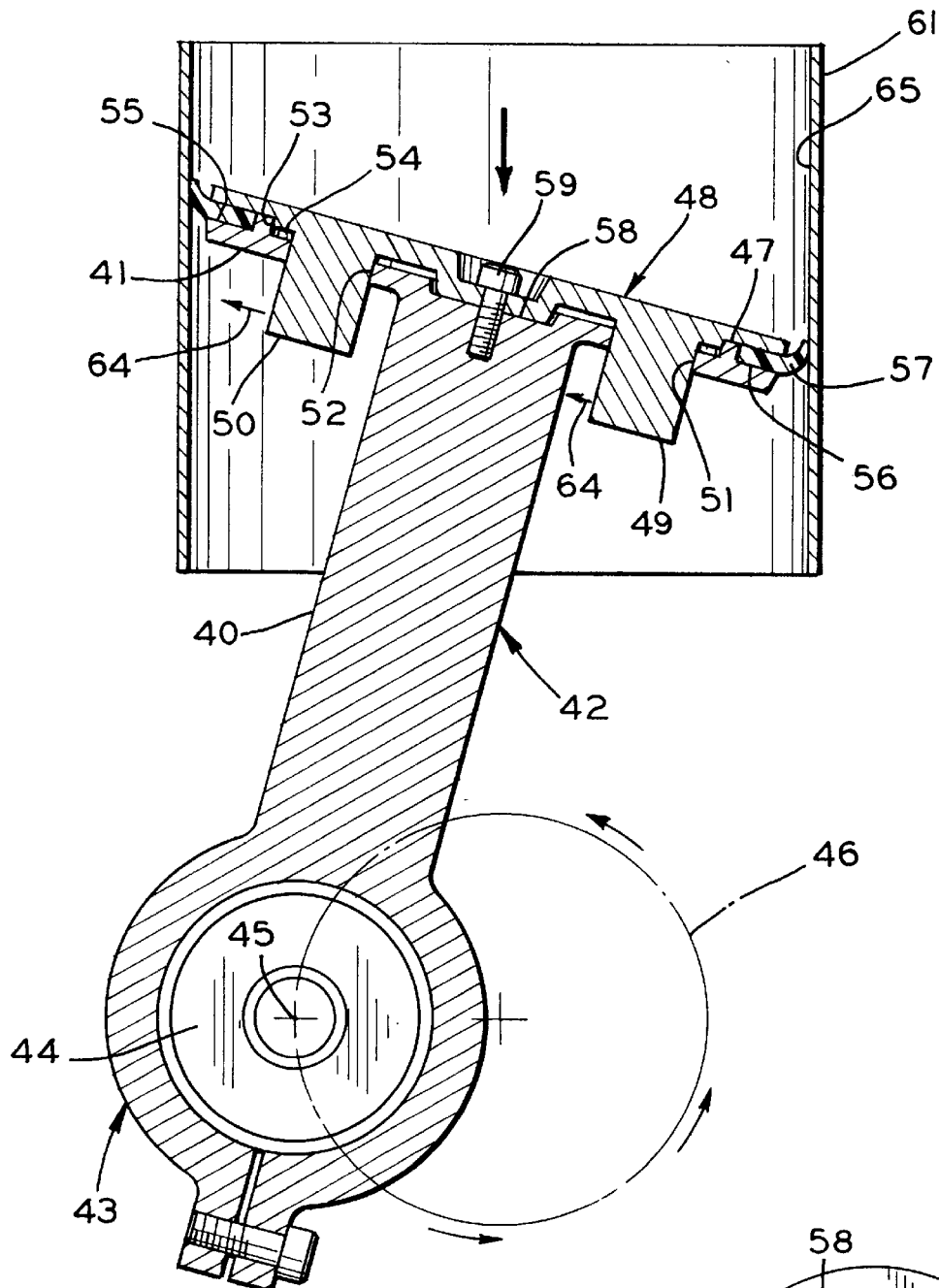
FIG. 4 is an enlarged cross sectional showing the piston of FIG. 3 as it moves and tilts in a cylinder during operation of a compressor.
Figure 5:
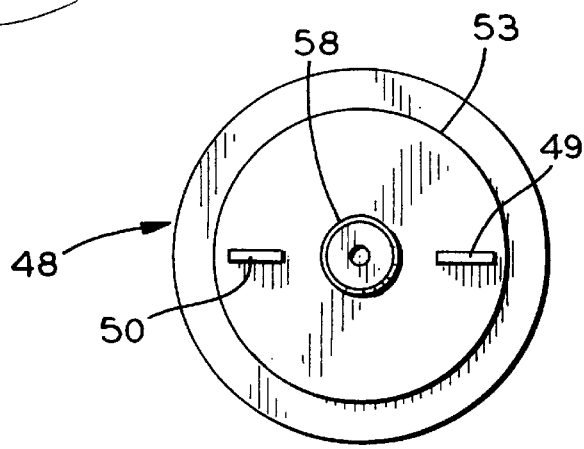
FIG. 5 is bottom view of a piston cap in accordance with the invention.

FIGS. 3 and 4 show an improved air cooled wobble piston 40 constructed in accordance with the invention. The piston 40 has a head 41 formed integrally with a connecting rod 42. The connecting rod 42 has a lower or free end 43 which mounts a bearing 44 and has an axis 45 (extending perpendicular to the drawing in FIGS. 3 and 4) and receives an eccentric (not shown) mounted on a flywheel or on a crankshaft. The eccentric moves the free end so that the axis 45 moves around a circle 46 (FIG. 4) in the conventional manner.

The piston head 41 is generally flat and has an upwardly extending annular rib 47. A cap 48 is positioned on the annular rib 47 with at least two cooling fins 49 and 50 extending downwardly through cooperating slots 51 and 52, respectively, formed in the piston head 41 and into the cooler ambient air found below the piston head 41. Additional cooling fins (not shown) may also be provided which extend downwardly through cooperating slots (not shown) formed in the piston head 41. In the preferred embodiment illustrated in the drawings, the fins 49 and 50 extend in a plane which is perpendicular to the axis 45. However, the fins may also be employed in accordance with the invention in alternate orientations, to achieve the desired air flow characteristics past the fins.

An annular, downwardly extending rib 53 may be provided on a bottom surface 54 of the cap 48 to properly center the cap 48 on the piston head 41. An annular groove 55 is defined by the top edge 56 of the piston head 41 and the radially outer portion of the bottom surface 54 of the cap 48. The annular groove 55 provides a means for retaining an annular piston ring or seal 57.

The bottom of a recess 58 formed in the center of the piston cap 48 abuts the piston head 41. A screw 59 or the like secures the cap 48 to the piston head 41, thereby also retaining the piston ring or seal 57 within the annular groove 55.

FIG. 4 illustrates the piston 40 moving in a cylinder 61 as the eccentric moves the free connecting rod end 43 about the circle 46. At the illustrated position, the piston 40 is moving downwardly on an intake or suction stroke and the free connecting rod end 43 has moved 90 degrees about the circle 46 from top dead center. As is illustrated, the piston head 41 tilts or rotates as it is reciprocated in the cylinder 61 so that the side of the piston head 41 adjacent to fin 50 is above the right side of the piston head 41 adjacent to the fin 49.

As the piston 41 moves to the illustrated position from top dead center, the right side of the piston head 41 will accelerate and move faster than the left side of the piston head 41. Consequently, the air pressure on the right side will be greater than the air pressure on the left side, as illustrated by arrows 64 in FIG. 4. As will be appreciated by those skilled in the art, the direction 64 of the air flow will change with changes in the relative rotational motion.

The air flow over fins 49 and 50 causes cooling of the piston cap 48 and the piston head 41, which in turn reduces both the operating temperature of the seal 57 and the heat transferred to air in a compression chamber 65 in the cylinder 61 above the piston 40. This increases both the operating life of the seal 57 and the volumetric efficiency of the compressor.

It is to be understood that the form of the invention herewith shown and described as illustrative only, and that various changes in the shape, size and arrangement of the elements may be resorted to without departing from the spirit of the invention.

What is claimed is:

1. In a wobble piston of the type having a piston head rigidly connected to a connecting rod, said connecting rod having a free end for movement by an eccentric about a circle, said piston head reciprocating and rotating in a cylinder as said free end is moved, the improvement comprising at least two cooling fins extending through slots formed in said piston head, whereby air is caused to flow against said cooling fins as said piston head is reciprocated in a cylinder.

2. A wobble piston as set forth in claim 1, wherein a piston cap is secured to said piston head, and said cooling fins are rigidly secured to said piston cap.

3. A wobble piston as set forth in claim 2, wherein said cooling fins are integral with said piston cap.

4. A wobble piston as set forth in claim 2, wherein said wobble piston further includes an annular seal secured between said piston cap and said piston head.

5. A wobble piston as set forth in claim 1, wherein said free end of said connecting rod defines an axis and said at least two fins extend in a plane which is substantially perpendicular to said axis.

6. In a wobble piston of the type having a piston head rigidly connected to a connecting rod and a piston cap secured to said piston head, said connecting rod having a free end for movement by an eccentric about a circle, said piston head reciprocating and rotating in a cylinder as said free end is moved, the improvement comprising at least two cooling fins located on the piston cap and extending through slots formed in said piston head, whereby air is caused to flow against said cooling fins as said piston head is reciprocated in a cylinder.

\* \* \* \* \*